(12) United States Patent
Brabec et al.

(10) Patent No.: US 10,222,054 B2
(45) Date of Patent: Mar. 5, 2019

(54) LUMINAIRE FOR INSTALLATION IN AN ELECTRICAL HOUSEHOLD APPLIANCE

(71) Applicant: emz-Hanauer GmbH & Co. KGaA, Nabburg (DE)

(72) Inventors: Martin Brabec, Nabburg (DE); Johann Schenkl, Bodenwoehr (DE); Manfredi Signorino, Milan (IT)

(73) Assignee: emz-Hanauer GmbH & Co. KGaA, Nabburg (DE)

( * ) Notice: Subject to any disclaimer, the term of this patent is extended or adjusted under 35 U.S.C. 154(b) by 66 days.

(21) Appl. No.: 15/057,467

(22) Filed: Mar. 1, 2016

(65) Prior Publication Data

US 2016/0258616 A1    Sep. 8, 2016

(30) Foreign Application Priority Data

Mar. 3, 2015    (DE) .......................... 10 2015 002 653

(51) Int. Cl.
*F21V 33/00*    (2006.01)
*F21V 8/00*    (2006.01)
(Continued)

(52) U.S. Cl.
CPC .......... *F21V 33/0044* (2013.01); *D06F 37/20* (2013.01); *F21K 9/00* (2013.01);
(Continued)

(58) Field of Classification Search
CPC . A47L 9/30; A47L 5/34; A47L 9/2857; F25D 27/00; F21W 2131/305;
(Continued)

(56) References Cited

U.S. PATENT DOCUMENTS 6,149,283 A * 11/2000 Conway .................. F21S 10/02
                                                      362/236
6,685,335 B1 * 2/2004 Yeh .......................... F21L 4/00
                                                      362/184
(Continued)

FOREIGN PATENT DOCUMENTS

DE         3843385 A1     7/1990
DE         3843386 A1     7/1990
(Continued)

OTHER PUBLICATIONS

Search report from German Patent Office for priority document DE 10 2015 002 653.4, dated Oct. 1, 2015.

*Primary Examiner* — Alan B Cariaso
(74) *Attorney, Agent, or Firm* — Robert R. Deleault, Esq.; Mesmer & Deleault, PLLC

(57) ABSTRACT

A luminaire for installation in an electrical household appliance, e.g. a washing machine, includes, in one embodiment, two light-emitting diodes mounted on a circuit board, an elongated luminaire housing having a light exit area, which is formed by a light-permeable piece of the housing wall, in an area of a first longitudinal end of the luminaire housing, and also a light-conducting body having a light-conducting tube which extends inside the luminaire housing and which conducts, towards the light exit area, light which is given off by the light-emitting diodes. In one embodiment, a metalizing layer provided on the inner peripheral face of the light-conducting tube rests, in heat-transmitting contact with one or more conductive traces, on the upper side of the circuit board. In addition to its light-conducting function, the light-conducting tube thus fulfills a function for discharging heat from the circuit board.

12 Claims, 1 Drawing Sheet

(51) Int. Cl.
*F21V 29/00* (2015.01)
*F21V 15/01* (2006.01)
*F21V 29/508* (2015.01)
*F21V 29/503* (2015.01)
*D06F 37/20* (2006.01)
*F21K 9/00* (2016.01)
*F21V 7/04* (2006.01)
*F21V 13/02* (2006.01)
*F21V 17/16* (2006.01)
*F21W 131/307* (2006.01)
*F21W 131/30* (2006.01)
*F21Y 115/10* (2016.01)
*F21Y 113/13* (2016.01)

(52) U.S. Cl.
CPC .............. *F21V 7/043* (2013.01); *F21V 13/02* (2013.01); *F21V 15/01* (2013.01); *F21V 29/508* (2015.01); *G02B 6/0096* (2013.01); *F21V 17/164* (2013.01); *F21V 29/503* (2015.01); *F21W 2131/30* (2013.01); *F21W 2131/307* (2013.01); *F21Y 2113/13* (2016.08); *F21Y 2115/10* (2016.08)

(58) Field of Classification Search
CPC .......... F21W 2131/30; F21W 2131/307; F24C 15/008; F21Y 2101/02; F21Y 2113/13; F21K 9/00; F21V 33/00; F21V 33/0004; F21V 33/0044; F21V 13/02; F21V 15/01; F21V 7/043; F21V 17/164; F21V 29/503; F21V 29/507; F21V 29/508; F21V 29/89; G02B 6/0096; D06F 37/20
USPC ..................................... 362/555, 91, 92, 253
See application file for complete search history.

(56) References Cited

U.S. PATENT DOCUMENTS

| | | | | |
|---|---|---|---|---|
| 7,588,351 | B2* | 9/2009 | Meyer ................. | F21V 3/02 |
| | | | | 362/294 |
| 8,297,767 | B2* | 10/2012 | Tseng ................. | F21V 7/22 |
| | | | | 362/2 |
| 8,922,108 | B2* | 12/2014 | Hussell ................. | F21K 9/56 |
| | | | | 313/483 |
| 8,950,882 | B2* | 2/2015 | Park ................. | F21V 33/0044 |
| | | | | 362/23.07 |
| 9,170,001 | B2 | 10/2015 | Schenkl | |
| 9,279,548 | B1* | 3/2016 | Fleming ................. | F21K 9/233 |
| 2004/0141336 | A1* | 7/2004 | West ................. | A61C 19/004 |
| | | | | 362/555 |
| 2010/0046197 | A1* | 2/2010 | Wang ................. | H01L 33/642 |
| | | | | 362/84 |
| 2011/0291560 | A1* | 12/2011 | Wang ................. | F21V 29/83 |
| | | | | 315/32 |
| 2012/0120667 | A1* | 5/2012 | Schenkl ................. | D06F 37/266 |
| | | | | 362/335 |
| 2013/0114268 | A1* | 5/2013 | Shigematsu ................. | F21S 8/00 |
| | | | | 362/308 |
| 2013/0329433 | A1 | 12/2013 | Min-Feng et al. | |
| 2014/0043845 | A1* | 2/2014 | Chen ................. | G02B 6/0011 |
| | | | | 362/555 |
| 2014/0320040 | A1 | 10/2014 | Katu et al. | |

FOREIGN PATENT DOCUMENTS

| | | |
|---|---|---|
| DE | 10231326 A1 | 2/2004 |
| DE | 10323542 A1 | 12/2004 |
| DE | 102010046342 A1 | 3/2012 |
| EP | 2112424 A1 | 10/2009 |
| WO | 2011012292 A1 | 2/2011 |
| WO | 2013164163 A1 | 11/2013 |

* cited by examiner

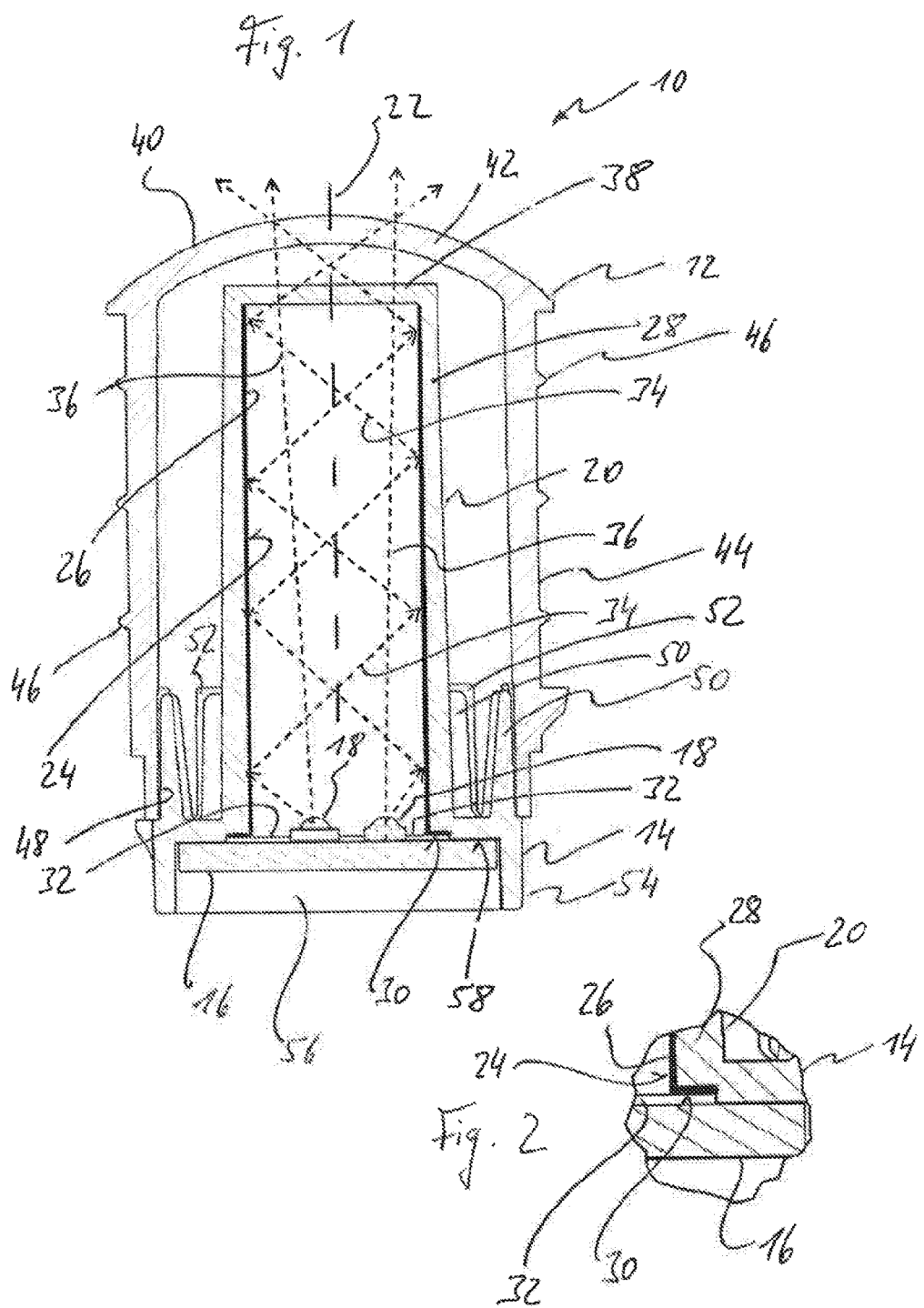

LUMINAIRE FOR INSTALLATION IN AN ELECTRICAL HOUSEHOLD APPLIANCE

BACKGROUND OF THE INVENTION

1. Field of the Invention

The present invention relates generally to a luminaire for installation in an electrical household appliance. Particularly, the luminaire, in certain embodiments, is arranged to illuminate an interior space of the household appliance. Examples of a household appliance in which illumination of the interior space may be desirable include a washing machine and an electric oven.

2. Description of the Prior Art

As regards conventional luminaires which are suitable for illuminating the interior space of a washer drum belonging to a washing machine, the reader is referred to DE 38 43 385 A1, DE 38 43 386 A1 and WO 2011/012292 A1.

German Published Patent Appl. No. DE 38 43 385 (Krimphoff et al., 1990) discloses a front-loading drum-type washing machine with an electrical light source for illuminating the laundry-drum interior. The laundry drum is arranged rotatably in a tub and a concertina-type seal extends between the machine housing and the tub around the loading orifice. The loading orifice is closed by a pot-like bull's eye door window extending as far as the laundry drum. The electrical light source is enclosed in a transparent protective hollow body which is retained in the front side of the machine housing and which is guided through the concertina-type seal in such a way that its light-exit part is located essentially outside the concertina-type seal.

German Published Patent Appl. No. DE 38 43 386 (Gute et al., 1990) discloses a front-loading drum-type washing machine with an electrical light source for illuminating the laundry-drum interior. The laundry drum is arranged rotatably in a tub and a concertina-type seal extends between the machine housing and the tub around the loading orifice. The loading orifice is closed by a pot-like bull's eye door window extending as far as the laundry drum. The electrical light source is provided outside the tub. The light source is assigned a light guide which is guided through the concertina-type seal and which is directed with its light-exit region towards the inside of the laundry-drum rear wall.

PCT Published Appl. No. WO 2011/012292 (Schenkl, 2011) discloses a household appliance light emitting device having a light diode that emits a light beam having a cross-section area and a light deflection device through which the light beam travels and that deflects the entering light beam such that the light beam exits asymmetrically to the optical axis of the household appliance light emitting device from the light deflection device. The light deflection device is designed integrally with a housing where the light diode is arranged.

SUMMARY OF THE INVENTION

In certain embodiments of the present invention, the luminaire comprises a light-source arrangement, an elongated luminaire housing having a light exit area, which is formed by a light-permeable piece of the housing wall, in the area of a first longitudinal end of the luminaire housing, and also a light-conducting body having a tubular light-conducting member which extends inside the luminaire housing and which conducts, towards the light exit area, light which is given off by the light-source arrangement. If the light-source arrangement emits light with a comparatively broad angular spectrum and the light exit area of the luminaire housing is at a certain distance of, for example, one or more centimeters from the light-source arrangement, the light-conducting body may serve, by means of its tubular light-conducting member, to focus or concentrate the light emitted by the light-source arrangement and to bring it forward, in a convergent manner, to a point close to the light exit area. In this way it is possible, in spite of the comparatively broad angular spectrum of the light emitted by the light-source arrangement, to achieve a high light yield at the location of the light exit area.

A comparable effect may be produced by a lens having a converging characteristic which collimates (i.e. parallelizes) the light emitted by the light-source arrangement and directs it to the light exit area. A converging lens of this kind is not necessary in the case of the luminaire according to the invention, since a converging effect can already be achieved by the tubular light-conducting member of the light-conducting body. Of course, it should be pointed out that the presence of a converging lens, in addition to the light-conducting body, is in no way ruled out within the scope of the invention.

In certain embodiments, the light-conducting member possesses an inner peripheral face which is of metallic construction, at least in certain regions. This may be brought about, for example, through the fact that the light-conducting member has a tube wall which is formed from a plastic material and which is provided, on the inner periphery, with a metal coating. The metal coating may be, for example, a vapor-deposited layer of aluminum or silver. Alternatively, it is conceivable to produce the tubular light-conducting member completely from a metal material. As a result of the metallic configuration of the inner peripheral face of the light-conducting member, particularly good reflective properties are achieved for the light which is guided within the tubular light-conducting member. Although it is not ruled out, within the scope of the invention, for the tubular light-conducting member to be of metallic construction only at certain points (i.e. in certain regions) on its inner peripheral face, one embodiment of the invention makes provision for the tubular light-conducting member to be of metallic construction over its entire inner peripheral face. A metallic construction of the inner peripheral face of the tubular light-conducting member may be brought about, for example, through the fact that a metallic inner tube is inserted in a non-metallic outer tube or, commonly, use is made of a metallic insert which is inserted in a non-metallic outer part. Even a one-piece configuration, which is manufactured by the two-component technique, of the light-conducting member is conceivably possible, one of the components (which forms the inner peripheral face or part of the latter) being a metal material. Also conceivably possible is a configuration in which the light-conducting member is formed by a metallically painted plastic or glass body.

The light-conducting member may be closed, in the area of an end of the tube which is close to the light exit area, by a light-permeable piece of the end wall. Light which is guided within the tubular light-conducting member passes through this piece of the end wall before reaching the light exit area of the luminaire housing. Naturally, it is possible, in an alternative configuration, for the tubular light-conducting member to be of open design in the area of that end of its tube which is close to the light exit area.

In certain embodiments, the light-source arrangement is mounted on a circuit board, the tubular light-conducting member projecting above the circuit board with an axis of the tube which is perpendicular to the plane of the board.

The light-source arrangement may have at least one light-emitting diode, it being possible, for the purpose of producing white light which is given off by the luminaire, for the light-source arrangement to have two (or more) light-emitting diodes having different emission spectra (e.g. blue and yellow). As a result of multiple reflections of the light given off by the light-source arrangement on the inner peripheral face of the tubular light-conducting member, it is possible to achieve good spatial mixing of the various spectral components of the light from the light-emitting diodes, so that the impression of white light is produced for an observer.

In certain embodiments, the light-conducting body has a metal material which is in heat-transmitting contact with at least one conductive trace of the circuit board, the metal material extending along at least part of the length of the tube of the light-conducting member. As a result of the heat-transmitting contact with the metal material of the light-conducting body, it is possible to discharge heat which is produced on the circuit board as a result of the operation of electrical parts mounted on it. This heat is transmitted into the light-conducting body and especially into the tubular light-conducting member. The comparatively large surface of the light-conducting member guarantees satisfactory distribution of the heat and thereby comparatively low heating-up of the luminaire as a whole. Because of the dissipation of heat from the circuit board into the light-conducting body, it is possible to configure the circuit board itself so as to be of comparatively small dimensions. The metal material of the light-conducting body may be formed, for example, by a metal coating on the inner periphery, which coating extends over the entire length of the tube. The heat-transmitting contact may be brought about, for example, by a soldered connection or by an adhesive which conducts heat well. Naturally, direct contact of the metal material of the light-conducting body with a metallic component arranged on the circuit board is also possible, without using additional connecting means. The metallic components of the circuit board may be formed, for example, by one or more conductive traces belonging to the circuit board. Alternatively, or in addition, to this, it is conceivable for there to be formed on the circuit board one or more metal points which consist of soldering tin and with which the metal material of the light-conducting body is in abutting contact.

The light-conducting body may have an end area which is open in a pot-like manner and in which the circuit board is inserted. If the end area possesses an aperture cross-section which is adapted to the circuit board, satisfactory radial support of the circuit board (radial with respect to the axis of the tube) can be achieved, relative to the light-conducting body. In addition, the pot-like configuration of the end area of the light-conducting body ensures precise axial positioning of the circuit board relative to the light-conducting body, through the fact that the circuit board is inserted into the end area of the body until it abuts against an axial stop face that serves as the bottom of the pot.

In certain embodiments, the tubular light-conducting member is constructed in the shape of a cylindrical tube, and therefore possesses a cross-sectional shape and size that remains the same over the tube length. Naturally, designing the tubular light-conducting member with a cross-sectional shape and/or size that varies over the tube length is not ruled out.

Simple mounting of the luminaire is possible through the fact that the luminaire housing has a housing aperture in the area of a second longitudinal end and the light-conducting body is inserted in the luminaire housing through the housing aperture with the tubular light-conducting member in front.

According to another aspect, the present disclosure also makes provision for an electrical household appliance equipped with a luminaire of the kind described above for illuminating an interior space of the appliance. The electrical appliance may be, for example, a washing machine, the luminaire being installed in a door seal of the machine. Alternatively, the electrical appliance may be, for example, an oven (baking oven, steam cooker or the like).

Embodiments of the present invention will be explained in more detail hereinafter with reference to the accompanying drawings.

BRIEF DESCRIPTION OF THE DRAWINGS

FIG. 1 represents a sectional representation through a luminaire according to one example of embodiment.

FIG. 2 represents a detail of FIG. 1 in an enlarged representation.

DETAILED DESCRIPTION OF THE PREFERRED EMBODIMENT

The luminaire shown in FIG. 1 is designated generally by 10. It has a luminaire housing 12 produced from a transparent plastic material, a light-conducting body 14 and an electronics plate (circuit board) 16, on which there are mounted a plurality of light-emitting diodes 18 and also, optionally, other electrical parts. In the case of the example shown, a total of two light-emitting diodes 18 can be seen on the circuit board 16. These emit light within different wave ranges, so that an impression of white light is produced when the light from the two light-emitting diodes 18 is mixed. For example, one of the light-emitting diodes 18 emits light within a blue wave range, while the other of the light-emitting diodes 18 emits light within a yellow or yellow/orange wave range.

The light-conducting body 14 forms a light-conducting tube 20 having an axis 22. The light-conducting tube 20 rests on the circuit board 16, with its axis 22 extending perpendicularly to the plane of the circuit board 16. The two light-emitting diodes 18 are located inside the light-conducting tube 20. On its inner peripheral face—which is designated by 24—the light-conducting tube 20 is provided with a metalizing layer 26 consisting, for example, of aluminum or silver, which is applied, for example in a vaporization process, to a base body 28 of the light-conducting body 14, which base body is produced from a plastic material. In the figures, the metalizing layer 26 is indicated diagrammatically by a line of increased thickness. It extends over the entire length of the tube on the inner peripheral face 24 and over the entire inner periphery of the light-conducting tube 20, and also extends as far as an end face 30 which is adjacent to the circuit board 16 and adjoins the inner peripheral face 24 and by means of which the light-conducting tube 20 rests on one or more metallic conductive traces—which are indicated at 32. The metalizing layer 26 is in heat-transmitting contact, which may be assisted, for example, by a soldered joint or an adhesive capable of conducting heat, with these conductive traces 32 (or/and with tinned soldered points). The circuit board 16 may therefore be fixedly connected to the metalizing layer 26 and, as a result, to the light-conducting body 14 by a soldered joint or by an adhesive of this kind which is applied to the conductive traces 32. Alternatively, it is possible for the light-conducting body 14 to merely rest, with its metalizing layer 26, on one or more metallic components of the circuit board 16 (e.g. soldering lugs), without being fixedly connected to the circuit board 16.

The metalizing layer 26 brings about reflections of the light emitted by the light-emitting diodes 18 inside the light-conducting tube 20, as indicated by arrows 34 in broken lines in FIG. 1. At the same time, part of the light emitted by the light-emitting diodes 18 passes through the light-conducting tube 20 without being reflected, as indicated by arrows 36 in broken lines in FIG. 1. In the area of that end of the tube which is axially remote from the light-emitting diodes 18, the light-conducting tube 20 is closed by a piece 38 of the end wall which is a constituent part of the base body 28 but is devoid of the metalizing layer 26. The light which is conducted within the light-conducting tube 20 passes through this piece 38 of the end wall into the space between the piece 38 of the end wall and the luminaire housing 12. From there, the light passes out through a light exit area 40 which, in the case of the example shown, is formed by a convex piece 42 of the wall of the luminaire housing 12. Like the remaining part of the luminaire housing 12, the piece 42 of the housing wall is produced from a light-permeable plastic material.

Adjacent to the convex piece 42 of the housing wall, the luminaire housing 12 has a mounting section 44 which extends axially and is substantially cylindrical and which is designed, on its outer periphery, with one or more projections 46 which are, for example, rib-like and which serve to position the luminaire housing 12, and with it the luminaire 10 as a whole, in an axially secure manner in an installation aperture which belongs to an electrical household appliance of which no further details are represented and in which the luminaire 10 is to be installed. The installation aperture mentioned may be provided, for example, in a door seal of a household washing machine, as indicated in WO 2011/012292 A1 in FIG. 4 or in DE 38 43 385 A1 in the latter's single FIGURE. The content of these publications is incorporated herein by reference.

In the area of its opposite axial end from the piece 42 of the housing wall, the luminaire housing 12 is of open construction, i.e. has, at that point, a housing aperture 48 through which the light-conducting body 14 is inserted (with the light-conducting tube 20 in front) in the luminaire housing 12. The light-conducting body 14 possesses, distributed in the peripheral direction, a plurality of elastically deflectable latching tongues 50 which permit a latching connection between the luminaire housing 12 and the light-conducting body 14. At least some of the latching tongues 50 are able to engage, in a snapping manner, in corresponding latching recesses 52 belonging to the luminaire housing 12. By means of the latching tongues 50, the light-conducting body 14 is fixed in position axially, relative to the luminaire housing 12.

For its part, the circuit board 16 is inserted in an end section 54, which is open in a pot-like manner, of the light-conducting body 14. This end section 54 possesses an aperture 56 of the pot which has a cross-sectional shape and size that correspond to the contour of the circuit board 16, so that the circuit board 16 is fixed in position radially (referred to the axis 22 of the tube) in the aperture 56 of the pot of the end section 54. The bottom of the pot of the end section 54 is defined by an axial end face 58 which may lie within the same axial plane as the end face 30 or may be slightly offset axially in relation thereto (as indicated in FIG. 2). The end face 58 delimits the axial depth of insertion of the circuit board 16 in the aperture 56 of the pot of the end section 54. Fastening of the circuit board 16 to the light-conducting body 14 may be brought about, for example by adhesion or screwing, in the area of the end face 58.

As a result of the heat-conducting contact of the metalizing layer 26 with the conductive traces 32, discharge of the heat produced by the light-emitting diodes 18 and, optionally, other parts on the circuit board 16 is possible in the area of the light-conducting tube 20, so that overheating of the light-emitting diodes 18 and of the luminaire 10 as a whole can be avoided. In addition to its function for conducting light, the light-conducting tube 20 thereby also fulfils a function for dissipating heat, that is to say for cooling the circuit board 16 and the parts located thereon.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A luminaire for installation in an electrical household appliance, the luminaire comprising:
   a light-source arrangement;
   an elongated luminaire housing having a substantially cylindrical wall with a light-permeable convex piece formed at a first longitudinal end of the luminaire housing, which convex piece defines a light exit area in the region of the first longitudinal end of the luminaire housing;
   a light-conducting body forming a tubular light-conducting tube wherein the light-conducting body extends inside the luminaire housing to a position adjacent the convex piece and which conducts, towards the light exit area, light emitted from the light-source arrangement; and
   a circuit board, the light-source arrangement being mounted on the circuit board, wherein the light-conducting tube projects above the circuit board with a tube axis perpendicular to the plane of the circuit board,
   wherein the light-conducting tube includes a metal material in heat-transmitting contact with at least one conductive trace of the circuit board, the metal material extending along at least part of a tube length of the light-conducting tube,
   wherein the light-conducting tube has an axial end face which is adjacent the circuit board, the metal material extending as far as the axial end face,
   wherein the heat-transmitting contact of the metal material with the at least one conductive trace is established at the axial end face.

2. The luminaire of claim 1 wherein the light-conducting tube has an inner peripheral face, wherein at least a portion of the inner peripheral face is formed of the metal material.

3. The luminaire of claim 2 wherein the light-conducting tube has a tubular wall which is formed from a plastic material and which is provided, on an inner periphery, with a metal coating.

4. The luminaire of claim 1 wherein the end portion of the light-conducting tube extends beyond an end of the substantially cylindrical wall of the luminaire housing and adjacent the light exit area of the convex piece.

5. The luminaire of claim 1 wherein the light-source arrangement includes at least one light-emitting diode.

6. The luminaire of claim 1 wherein the light-source arrangement includes two light-emitting diodes having different emission spectra.

7. The luminaire of claim 1 wherein the light-conducting body has an end portion which is open in a pot-like manner and in which the circuit board is inserted, the end portion having a cross-section adapted to the circuit board.

8. The luminaire of claim 1 wherein the light-conducting tube has a shape of a cylindrical tube.

9. The luminaire of claim 1 wherein the luminaire housing has a housing aperture in the area of a second longitudinal end and the light-conducting body is inserted in the luminaire housing through the housing aperture with the tubular light-conducting tube in front.

10. An electrical household appliance having an interior space and at least one luminaire for illuminating the interior space, the luminaire comprising:
   a light-source arrangement;
   an elongated luminaire housing having a substantially cylindrical wall with a light-permeable convex piece formed at a first longitudinal end of the luminaire housing, which convex piece defines a light exit area in the region of the first longitudinal end of the luminaire housing;
   a light-conducting body forming a tubular light-conducting tube wherein the light-conducting body extends inside the luminaire housing to a position adjacent the convex piece and which conducts, towards the light exit area, light emitted from the light-source arrangement; and
   a circuit board, the light-source arrangement being mounted on the circuit board, wherein the light-conducting tube projects above the circuit board with a tube axis perpendicular to the plane of the circuit board,
   wherein the light-conducting tube includes a metal material in heat-transmitting contact with at least one conductive trace of the circuit board, the metal material extending along at least part of a tube length of the light-conducting tube,
   wherein the light-conducting tube has an axial end face which is adjacent the circuit board, the metal material extending as far as the axial end face,
   wherein the heat-transmitting contact of the metal material with the at least one conductive trace is established at the axial end face.

11. The electrical household appliance of claim 10 wherein the appliance is a washing machine and the luminaire is mounted in a door seal of the washing machine.

12. The electrical household appliance of claim 10 wherein the appliance is an oven.

* * * * *